(12) United States Patent
Wu

(10) Patent No.: US 7,197,919 B2
(45) Date of Patent: Apr. 3, 2007

(54) USER ADJUSTABLE CALIBRATION FEATURE FOR A TIRE PRESSURE GAUGE

(76) Inventor: Min Wu, 1219 Brandybuck Way, San Jose, CA (US) 92121

( * ) Notice: Subject to any disclaimer, the term of this patent is extended or adjusted under 35 U.S.C. 154(b) by 0 days.

(21) Appl. No.: 10/843,886

(22) Filed: May 11, 2004

(65) Prior Publication Data

US 2005/0252284 A1    Nov. 17, 2005

(51) Int. Cl.
*E01C 23/00* (2006.01)
*B60C 23/02* (2006.01)

(52) U.S. Cl. ........................................................ 73/146
(58) Field of Classification Search ............... 73/146.8, 73/146

See application file for complete search history.

(56) References Cited

U.S. PATENT DOCUMENTS

| | | | | |
|---|---|---|---|---|
| 1,742,740 A | * | 1/1930 | Watters | 73/709 |
| 4,768,460 A | * | 9/1988 | Soon-Fu | 116/272 |
| 4,788,525 A | * | 11/1988 | Lichtenstein | 340/442 |
| 4,966,035 A | * | 10/1990 | Huang | 73/146.8 |
| 5,554,803 A | * | 9/1996 | Huang | 73/146.8 |
| 5,939,627 A | * | 8/1999 | Huang | 73/146.8 |
| 2005/0005693 A1 | * | 1/2005 | Huang | 73/146.8 |

* cited by examiner

*Primary Examiner*—Max Noori
(74) *Attorney, Agent, or Firm*—Robert O. Guillot; Intellectual Property Law Offices

(57) ABSTRACT

The pressure gauge is designed for operative engagement with a gas pressurized system such as a pneumatic tire. It includes a housing having a pressurized gas inlet orifice and a cylindrical bore formed within the housing. A pressure reactive piston is slidably engaged within the cylindrical bore, and a resistance means is disposed within the cylinder to provide a resistive force to the movement of the piston. A calibration rod is disposed proximate the piston, whereby movement of the piston will cause movement of the rod. A pressure indicator bar, which is threadably engaged to the rod, provides an indication of the pressure level of the gas. The calibration rod has a user accessible end, and rotation of the rod causes a calibration adjustment of the pressure indicator bar due to the threaded engagement of the rod with the pressure indicator bar.

6 Claims, 2 Drawing Sheets

USER ADJUSTABLE CALIBRATION FEATURE FOR A TIRE PRESSURE GAUGE

BACKGROUND OF THE INVENTION

1. Field of the Invention

The present invention relates generally to pressure gauges and more particularly to an improved pressure gauge including a movable piston pressure sensing element and a gauge calibration element.

2. Description of the Prior Art

One embodiment of the present invention is designed to be similar in size and shape to truck tire gauge, to act as a replacement for it. The present invention generally utilizes a piston-type pressure element having a coil spring to provide a reactive force. Gauges of this general configuration are known in the prior art, and they are calibrated following assembly and before sale to the public. A problem with such prior art tire pressure gauges is that they can become inaccurate through usage, and it would be desirable to provide a mechanism for the user to accomplish a re-calibration of the gauge. Also, where the manufactured tire pressure gauge is calibrated at a manufacturer's selected calibration pressure, it is also desirable for the user to be able to re-calibrate the tire pressure gauge to obtain maximum accuracy at another user chosen pressure. The present invention provides a means for the user to re-calibrate a tire pressure gauge after it has been manufactured and calibrated by the manufacturer.

SUMMARY OF THE INVENTION

The pressure gauge is designed for operative engagement with an air pressurized system such as a pneumatic tire for an automobile or truck. It includes a housing having a pressurized air inlet orifice and a cylindrical bore formed within the housing. A pressure reactive piston is slidably engaged within the cylindrical bore, and a resistance means is disposed within the cylinder to provide a resistive force to the movement of the piston. A calibration rod is disposed proximate the piston, whereby movement of the piston will cause movement of the rod. A pressure indicator bar, which is threadably engaged to the rod, provides an indication of the pressure level of the air. The calibration rod has a user accessible slotted end, and rotation of the rod causes a calibration adjustment of the pressure indicator bar due to the threaded engagement of the rod with the pressure indicator bar.

It is an advantage of the present invention that it provides a pressure gauge that is relatively easy to manufacture.

It is another advantage of the present invention that it provides a pressure gauge that is easy to calibrate.

It is a further advantage of the present invention that it provides a pressure gauge that can be calibrated to a high degree of accuracy by the user.

It is yet another advantage of the present invention that provides a first calibration mechanism that is calibrated by the manufacturer, and a second user adjustable calibration mechanism, such that the device can remain re-calibrated throughout its lifetime.

The foregoing and other objects, features and advantages of the present invention will be apparent from the following detailed description of the preferred embodiments, which make reference to the several figures of the drawings.

IN THE DRAWINGS

DETAILED DESCRIPTION OF THE PREFERRED EMBODIMENTS

Figure 1:
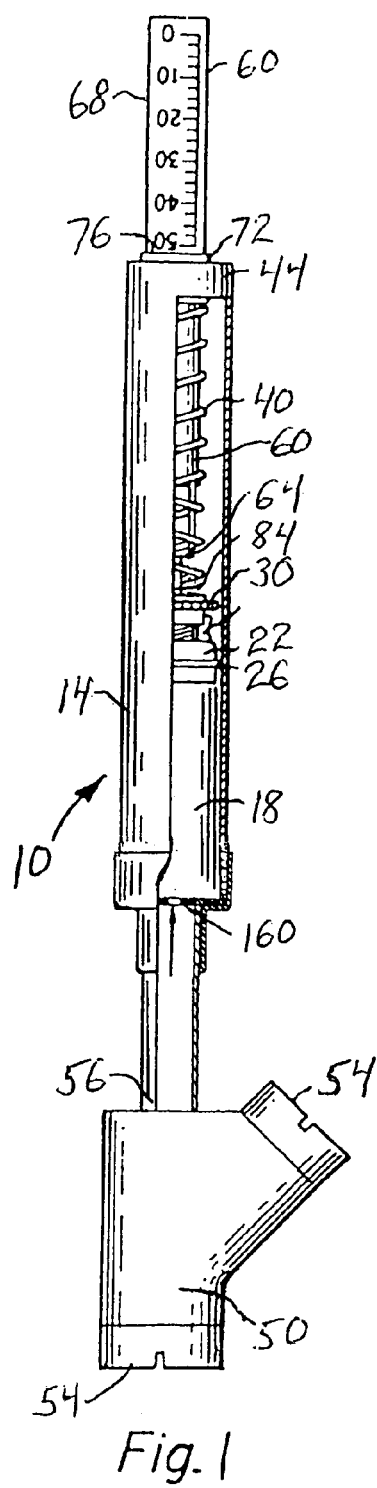
FIG. 1 is a side elevational view, with cross-sectional portions of a truck tire type pressure gauge of the present invention.

The present invention comprises a truck tire type pressure gauge, as depicted in FIGS. 1–4. The gauge 10 includes a cylindrical housing 14 enclosing a cylindrical piston bore 18. A piston member 22 having an O-ring seal 26 and a calibration nut 30 is disposed within the bore 18. A coil spring 40 is disposed within the bore 18 between the calibration nut 30 and the upper end 44 of the cylindrical housing 14. A dual-foot air chuck 50, or a dual-valve air chuck including nuts 54 and an air check (not shown) are engaged to the lower end 56 of the housing 14. The piston 22, O-ring seal 26, calibration nut 30 and coil spring 40 are substantially identical in form and function to those elements described the inventor's U.S. Pat. No. 5,965,822, and are generally described herebelow with the aid of FIG. 5.

A push type plunger pressure indicator bar 60 has a lower end 64 which resides within the bore 18 and an outer, calibrated end 68 that projects outwardly through the upper end 44 of the housing 14. A bar guide 72, having an opening 76, is fixedly engaged within the upper end 44. The indicator bar 60 is slidably engaged within the guide opening 76, and the lower end 64 of the indicator bar 60 has a projecting stop pin 78, such that it will not pass through the opening 76, whereby the indicator bar 60 is retained within the housing 14. With particular reference to the end elevational view of FIG. 3, the indicator bar 60 is generally rectangular in cross-section, and the opening 76 in the bar guide 72 is similarly rectangular, such that the indicator bar 60 is slidably engaged with the guide 72, but will not rotate within the guide 72.

Figure 2:
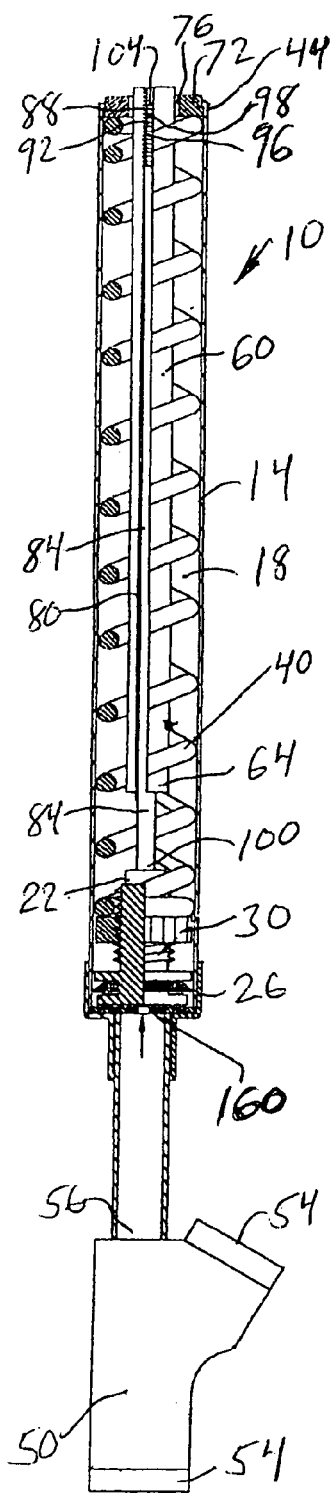
FIG. 2 is a more complete cross-sectional view of the gauge depicted in FIG. 1.
Figure 4:
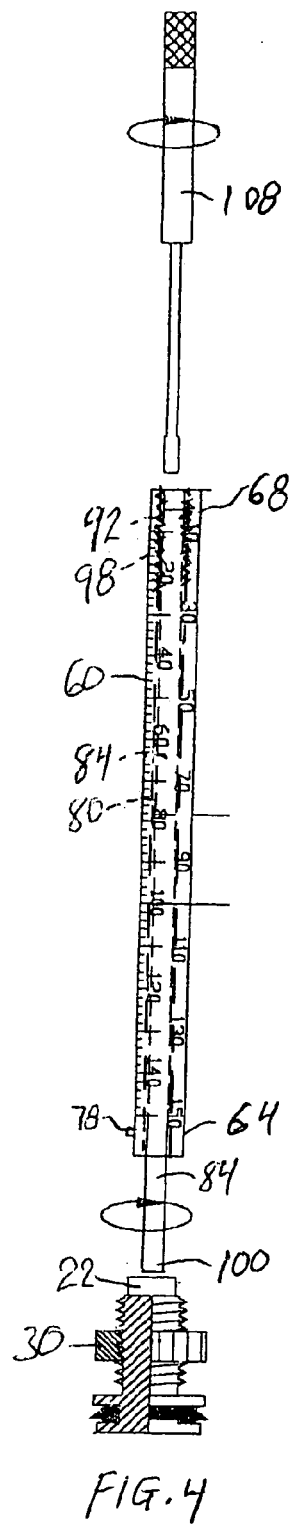
FIG. 4 is a cutaway view depicting components of the gauge depicted in FIG. 1.
Figure 3:
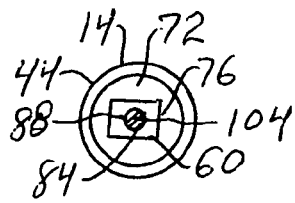
FIG. 3 is an end elevational view of the gauge depicted in FIG. 1.

With particular reference to FIGS. 2 and 3, the pressure indicator bar 60 is formed with a central bore 80 that projects along the longitudinal central axis of the bar, and a calibration rod 84 is disposed within the bore 80 along its central axis. The upper end 88 of the bar bore 80 is threaded 92, and the upper end 96 of the calibration rod 84 is similarly threaded 98, such that the calibration rod 84 is threadably engaged within the bore threads 92 of the indicator bar 60. The inner end 100 of the calibration rod 84 extends beyond the inner end 64 of the indicator bar 60, such that the inner end 100 of the calibration rod 84 rests upon, but is not engaged to, the upper surface of the piston 22. As is best seen in FIG. 3, the upper end 88 of the calibration rod is slotted 104, such that a screwdriver 108 or similar instrument may be used to rotate the calibration rod 84 in its threaded engagement with the indicator bar 60. Due to the non-rotatable engagement of the indicator bar 60 within the guide 72, the indicator bar 60 will not rotate when the calibration rod 84 is rotated by a user's application of a screwdriver 108 to the slotted outer end 88 of the calibration rod 84.

Figure 5:
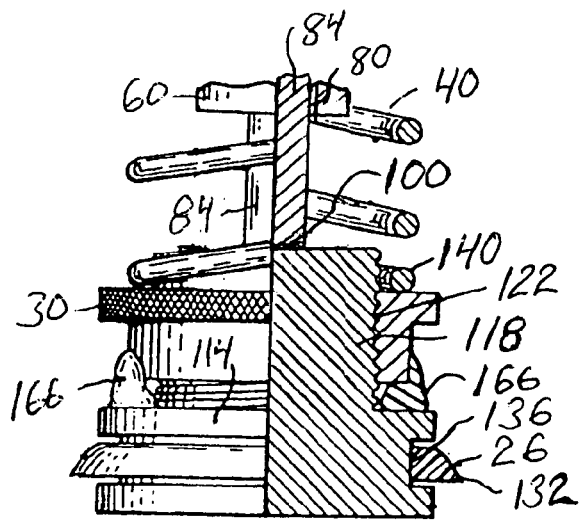
FIG. 5 is an enlarged, partially cross-sectional view of the piston element of the device depicted in FIGS. 1–4.

As is best seen with the aid of FIG. 5, the movable piston 22 is a generally cylindrical member including a generally widened lower section 114 and a generally narrowed upper section 118 having external threads 122 formed thereon. The internally threaded gauge calibration nut 30 is threadably engaged to the threaded upper section 118 of the piston 22. The calibration nut 30 is utilized to calibrate the gauge during the assembly and testing of the gauge components, as is discussed hereinbelow. An O-ring seal 26 having an outwardly projecting lip 132 is disposed within an O-ring groove 136 formed within the lower section 114. It is to be understood that the O-ring seal is disposed to make a moving pressurized seal with the inner walls of the housing bore 18. The lower end 140 of the coil spring 40 rests upon an upper surface of the calibration nut 30, and the upper end of the coil spring 40 presses against the upper end 44 of the housing 14, such that when the piston 22 moves upwardly, the coil spring 40 is compressed between the calibration nut 30 and the upper end 44 of the housing 14.

It is therefore to be understood that when the gauge 10 is utilized to determine the air pressure within a pneumatic tire that pressurized air from the tire enters through a gauge valve member 50 into the air tube 56 and passes through the air inlet hole 160. The pressurized air will then pass into the piston bore 18 to push the piston 22 upwardly against the resistance of the coil spring 40, thus pushing the calibration rod 84 with its threadably engaged indicator bar 60 outwardly. When the gauge 10 is removed from the tire, the air pressure within the cylinder 18 will decrease to atmospheric pressure and the piston 22 will return to its initial position. However, because the calibration rod 84 is not engaged to the piston, the indicator bar will remain at its extended position to indicate the maximum pressure which was detected by the gauge 10. The user of the device 10 must manually push the indicator bar 60 back into the cylindrical housing 14 after having read the indicated pressure.

While the use of a coil spring 40 to provide a restoring force is generally useful, because the spring's resistive force is directly proportional to the compressive force, a problem with the use of coil springs in the manufacturing of accurate instruments is that the spring constant of identically appearing coil springs can vary enough to greatly complicate quality control during manufacturing. That is, several manufactured gauges that appear to be identical in all details can report significantly different pressure readings due to the different spring constants of the different coil springs 40 disposed within the gauges. The inventor's prior art solution to this problem, as described in the inventor's prior art U.S. Pat. No. 5,965,882, is the utilization of the calibration nut 30 during the manufacturing process to correct this problem, as is next discussed.

During the manufacturing assembly steps for each pressure gauge 10, the various specific components of a particular gauge are chosen and assembled outside of the housing 14. In this assembly process a particular coil spring 40 will have been chosen. Those skilled in the art will understand that a completed, calibrated pressure gauge 10 will be most accurate at the pressure to which the gauge was calibrated and less accurate at pressure levels that are significantly different from the calibration pressure level. Thus, if it is known beforehand that a pressure gauge will be used in a situation where the greatest accuracy is required at approximately a specific pressure, the gauge 10 can be calibrated to that specific pressure, such that its greatest accuracy will occur there.

At a nearly finished manufacturing stage, the assembled gauge 10 is tested to a known pressure level which is preferably, though not necessarily close to the typical user's expected pressure reading on the gauge 10. In this test set up, the calibration nut 30 is generally initially disposed at approximately the mid-point of its threaded engagement range with the piston 22; the indicator bar 60 is likewise initially disposed at approximately the mid-point of its threaded engagement range with the calibration rod 84. Owing to the particular spring constant of the particular coil spring 40 within the gauge 10, the actual reading of the gauge 10 may differ significantly from the known test pressure level. The gauge 10 is then calibrated to read the correct test pressure level by rotating the threaded calibration nut 30 in the upward or downward direction that is required to move the piston 22, relative to the spring 40, such that the calibration rod 84 and its attached indicator bar 60 moves inwardly or outwardly. The calibration nut 30 is rotated to apply the selected calibration force on the piston 22 until the pressure indicator bar 60 accurately reflects the known test pressure level. Thereafter, the gauge is removed from the test set up, and the calibration nut 30 is permanently engaged in its test position by an appropriate method to the inner portion 114 of the piston 22. In the preferred embodiment, the calibration nut 30 is permanently affixed by soldering it 166 in position to the piston 22, however other equivalent methods for engaging the calibration nut 30 to the piston 22 are contemplated to be within the scope of the invention. Thus, in manufacturing a plurality of pressure gauges, each including a spring 40 having a different spring constant, the use of the calibration nut and calibration process will result in a plurality of gauges that are all most accurate at the same test pressure level.

Often, through ongoing usage, the spring constant or other spring parameters will change and the tire gauge will become less accurate. A user operable re-calibration means is then desirable, and the re-calibration means of the present invention includes the calibration rod 84 upon which the pressure indicator bar 60 is threadably mounted. As indicated above, the upper end 96 of the calibration rod 84 includes a screw head slot 104, such that it can be rotated by a screwdriver 108, with the user holding onto the pressure indicator bar 60.

Therefore, after extended usage, when the tire gauge no longer reads as initially calibrated, the user rotates the calibration rod 84 (such as by use of a screwdriver 108), whereupon the pressure indicator bar 60 will move inwardly or outwardly (depending upon the direction of rotation) due to its threaded engagement with the calibration rod 84, such that the indicator bar 60 will once again read as initially calibrated when measuring a test air pressure source.

Figure 6:
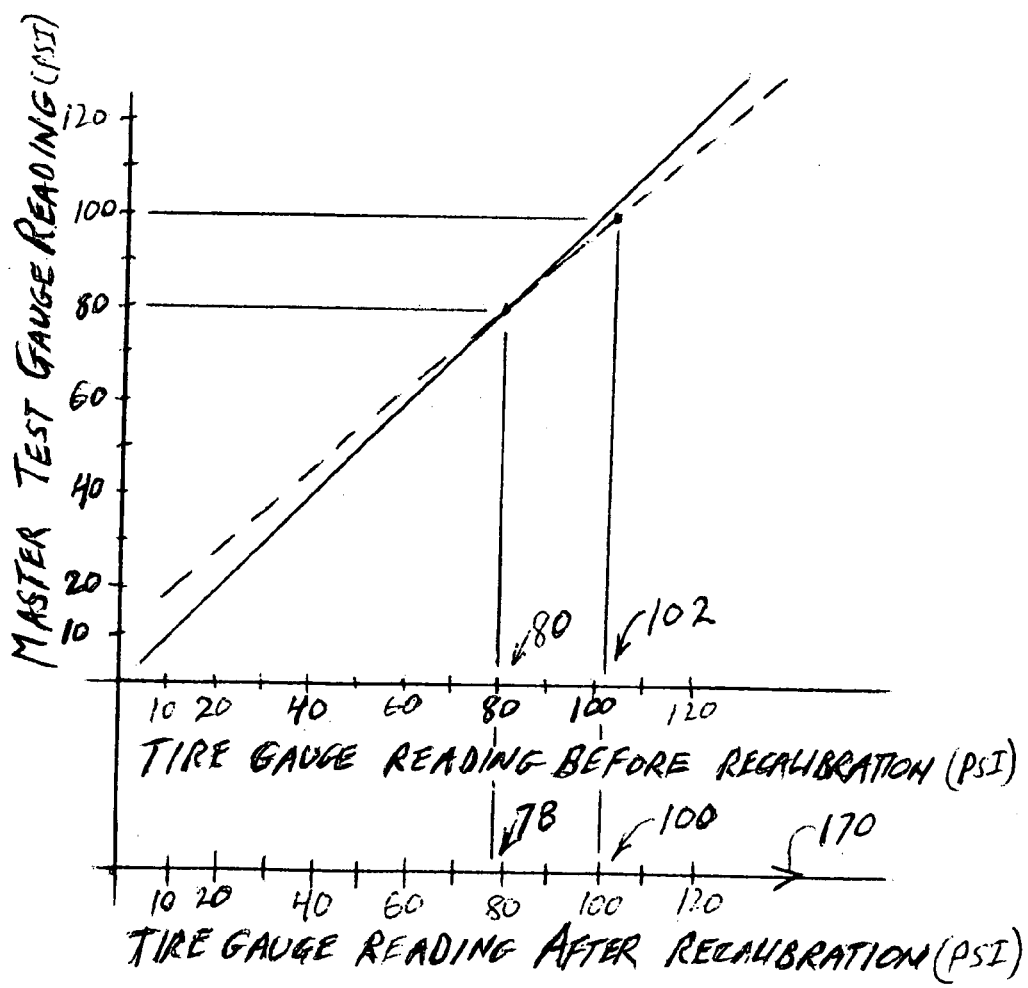
FIG. 6 is a graph depicting the operation of the re-calibration mechanism of the present invention.

FIG. 6 is a graph depicting the operation of the invention. The vertical axis represents a master test gauge reading and the two horizontal axes represents tire gauge indicator bar readings of the present invention. Initially, assuming the manufacturer's calibration pressure point is 80 PSI, it can be seen that the tire gauge reading before re-calibration (top horizontal axis) properly reads 80 PSI. However, the tire gauge pressure reading line (the dashed line) is not collinear with the reference gauge line; this represents the well known linear performance error of this type of gauge. Therefore, it can be seen that where the master test gauge reading is 100 PSI, the tire gauge reading before re-calibration may be 102 PSI. Now, if the user desires to re-calibrate the tire gauge such that it is accurate at 100 PSI, the user will use the screwdriver to turn the calibration rod 84, such that the indicator bar 60 is moved towards the right (lower horizontal axis) in FIG. 6 (see arrow 170) until the indicator bar properly reads 100 PSI. Therefore, after re-calibration, the tire gauge is re-calibrated to read 100 PSI to correspond with a master test gauge reading of 100 PSI.

Upon reading the specification and drawings provided hereinabove, it is to be understood that a significant feature of the embodiments described hereinabove is the utilization of the calibration rod in its threaded engagement with the pressure indicator bar to provide a means for the user to re-calibrate the gauge. Such a calibration is desirable due to the varying usage factors of the gauges subsequent to the initial factory calibration.

While the invention has been disclosed and described with regard to specific preferred embodiments, it is intended by the inventor that the following claims cover not only the specific embodiments described herein but other and further altered devices that would occur to those skilled in the art upon reviewing the specification and drawings provided herein. It is therefore intended that the following claims cover all such alterations and modifications which nevertheless include the true spirit and scope of the this invention.

I claim:

1. A pressure gauge for operative engagement with a gas pressurized system, comprising:
    a housing having an engagement means for the operative engagement of said gauge with said gas pressurized system;
    a pressurized gas inlet orifice being formed in said housing for inletting pressurized gas into said housing;
    a cylindrical bore being formed within said housing;
    a piston being slidably engaged within said cylindrical bore such that varying gas pressure will cause slidable motion of said piston within said cylindrical bore;
    a resistance means being disposed within said cylindrical bore to provide a resistive force to said movement of said piston;
    a calibration rod consisting of a single, cylindrical, integrally formed member including a threaded portion, said calibration rod being disposed proximate said piston, whereby movement of said piston will cause movement of said calibration rod;
    a pressure indicator bar being engaged to said calibration rod and functioning to provide an indication of the pressure level of said gas;
    wherein said pressure indicator bar has a central bore having a threaded portion thereof, and said calibration rod is disposed within said central bore and extends throughout said central bore, and wherein a threaded engagement is formed between said threaded portion of said calibration rod and said threaded portion of said central bore; and
    wherein said pressure indicator bar has an outer end that projects from said housing with user readable pressure indicia thereon, and wherein an outer end portion of said central bore is disposed within said outer end of said pressure indicator bar, and wherein said threaded portion of said central bore is disposed within said outer end of said pressure indicator bar, and wherein an outer end of said calibration rod includes said threaded portion of said calibration rod, and said outer ends of said central bore and said calibration rod are threadably engaged.

2. A pressure gauge as described in claim 1 wherein said resistance means comprises a coil spring, and wherein said coil spring is disposed between said piston and an end face of said housing.

3. A device as described in claim 1 wherein said pressure indicator bar is joined in a non-rotatable engagement with said housing.

4. A pressure gauge as described in claim 1 where said outer end of said calibration rod is accessible at an outer surface of the gauge to a user of the gauge.

5. A pressure gauge as described in claim 4 wherein said outer end of said calibration rod is formed with a screw head slot.

6. A pressure gauge as described in claim 1 wherein an inner end of said calibration rod is pushed by said piston on the pressurized movement of said piston, but detached from said piston when said pressure is released in said cylindrical bore and said piston returns to an initial position.

* * * * *